(12) United States Patent
Reid et al.

(10) Patent No.: US 12,552,139 B2
(45) Date of Patent: Feb. 17, 2026

(54) OVENABLE FLEXIBLE PACKAGING STRUCTURE

(71) Applicant: PROAMPAC HOLDINGS INC., Cincinnati, OH (US)

(72) Inventors: Vincent Reid, Peterborough (GB); Quang T. Phung, Addlestone (GB); Kevin Vyse, London (GB)

(73) Assignee: ProAmpac Holdings Inc., Cincinnati, OH (US)

( * ) Notice: Subject to any disclaimer, the term of this patent is extended or adjusted under 35 U.S.C. 154(b) by 256 days.

(21) Appl. No.: 18/369,655

(22) Filed: Sep. 18, 2023

(65) Prior Publication Data

US 2024/0092067 A1    Mar. 21, 2024

Related U.S. Application Data

(60) Provisional application No. 63/408,021, filed on Sep. 19, 2022.

(51) Int. Cl.
*B32B 27/10*        (2006.01)
*B32B 3/26*         (2006.01)
(Continued)

(52) U.S. Cl.
CPC .............. *B32B 27/10* (2013.01); *B32B 3/266* (2013.01); *B32B 7/12* (2013.01); *B32B 27/36* (2013.01);
(Continued)

(58) Field of Classification Search
CPC ........... B32B 27/10; B32B 3/266; B32B 7/12; B32B 27/36; B32B 37/12; B32B 37/24;
(Continued)

(56) References Cited

U.S. PATENT DOCUMENTS

| 4,874,620 A | 10/1989 | Mendenhall et al. |
| 6,033,114 A | 3/2000 | Grimm et al. |

(Continued)

OTHER PUBLICATIONS

International Search Report and Written dated Jan. 2, 2024 received in PCT/US2023/033065.

*Primary Examiner* — Michael C Miggins
(74) *Attorney, Agent, or Firm* — McLane Middleton, Professional Association

(57) ABSTRACT

The present disclosure relates generally to flexible product packaging and, in particular, to flexible packaging structures for products such as food products stored and transported for later reheating or cooking. In one aspect, an ovenable flexible packaging structure includes a paper layer having a first major surface and a second major surface opposite the first major surface, the paper layer having a cutout defining a window. A printed ink layer is disposed on the first major surface of the paper layer and a varnish layer is disposed over the printed ink layer. A heat sealable polyester layer is disposed on the second major surface of the paper layer, the heat sealable polyester layer having a strip of perforations formed therein. The strip of perforations and the cutout are at least partially overlapping with each other. An adhesive layer intermediate the paper layer and the heat sealable polymer layer includes an adhesive for adhesively bonding the paper layer to the heat sealable polymer layer. In further aspects, packaging articles formed of the flexible packaging structures and methods for making the flexible packaging structures and packaging articles are provided.

18 Claims, 4 Drawing Sheets

(51) Int. Cl.
    *B32B 7/12*      (2006.01)
    *B32B 27/36*     (2006.01)
    *B32B 37/12*     (2006.01)
    *B32B 37/24*     (2006.01)
    *B32B 38/00*     (2006.01)
    *B32B 38/04*     (2006.01)
    *B65D 65/40*     (2006.01)
    *B65D 65/42*     (2006.01)
    *B65D 81/34*     (2006.01)

(52) U.S. Cl.
    CPC .............. B32B 37/12 (2013.01); B32B 37/24 (2013.01); B32B 38/0004 (2013.01); B32B 38/04 (2013.01); B65D 65/40 (2013.01); B65D 65/42 (2013.01); B65D 81/343 (2013.01); *B32B 2037/243* (2013.01); *B32B 2038/047* (2013.01); *B32B 2250/02* (2013.01); *B32B 2255/12* (2013.01); *B32B 2255/28* (2013.01); *B32B 2307/31* (2013.01); *B32B 2307/718* (2013.01); *B32B 2307/7376* (2023.05); *B32B 2307/748* (2013.01); *B32B 2317/12* (2013.01); *B32B 2367/00* (2013.01); *B32B 2439/46* (2013.01); *B32B 2439/70* (2013.01)

(58) Field of Classification Search
    CPC ................ B32B 38/0004; B32B 38/04; B32B 2307/243; B32B 2038/047; B32B 2250/02; B32B 2255/12; B32B 2255/28; B32B 2307/31; B32B 2307/718; B32B 2307/7376; B32B 2307/748; B32B 2317/12; B32B 2367/00; B32B 2439/46; B32B 2439/70; B32B 2307/306; B32B 7/14; B32B 2255/26; B65D 65/40; B65D 65/42; B65D 81/343; B65D 81/34
    See application file for complete search history.

(56) References Cited

U.S. PATENT DOCUMENTS

| | | |
|---|---|---|
| 2008/0199644 A1 | 8/2008 | Chang |
| 2022/0088897 A1 | 3/2022 | Huffer |

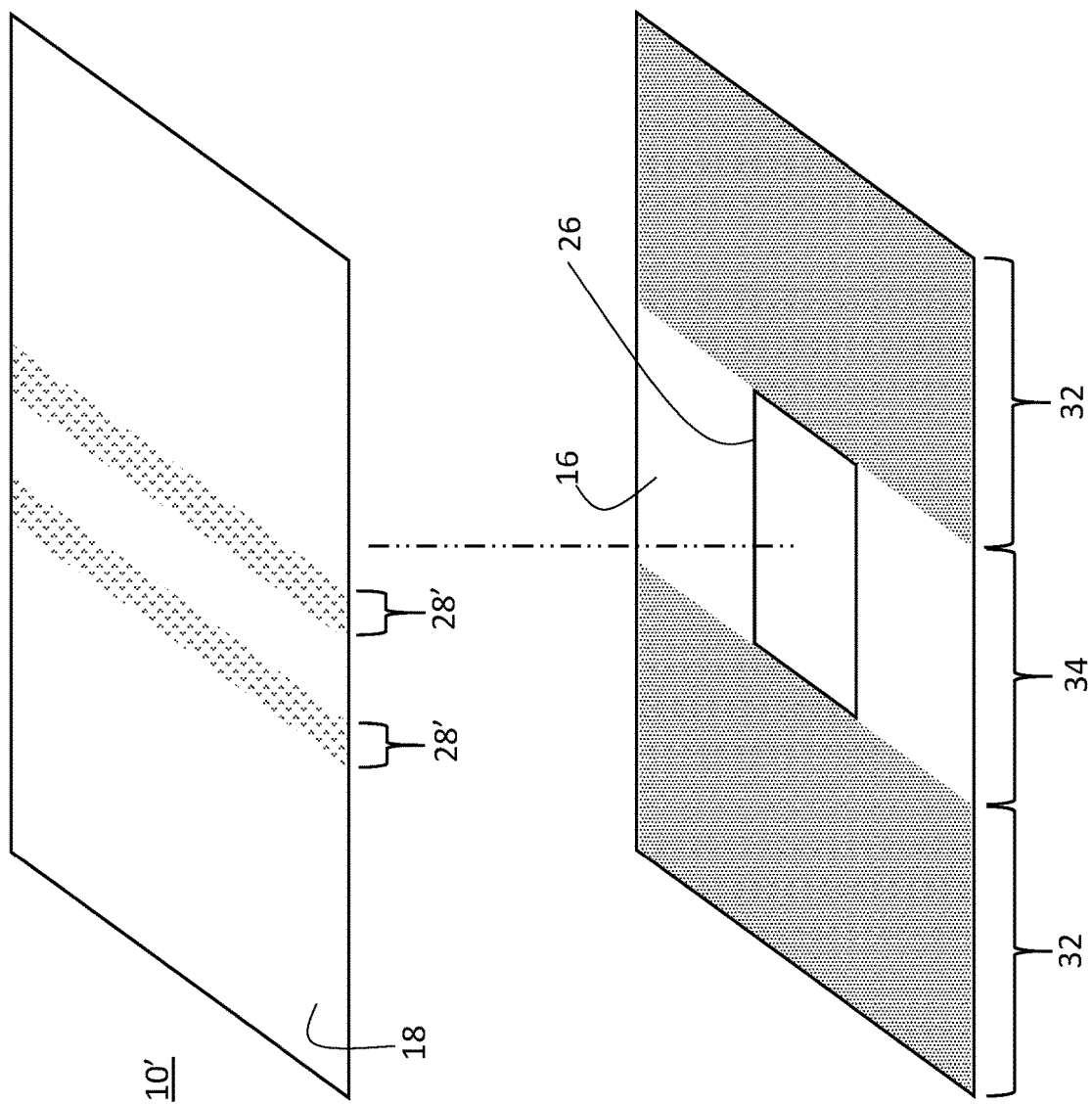

OVENABLE FLEXIBLE PACKAGING STRUCTURE

CROSS REFERENCE TO RELATED APPLICATION

This application claims the priority benefit of U.S. Provisional Application No. 63/408,021 filed Sep. 19, 2022. The aforementioned application is incorporated here by reference in its entirety.

BACKGROUND

The present disclosure relates generally to flexible product packaging and, in particular, to flexible packaging structures for products such as food products stored and transported for later reheating or cooking.

In one aspect, an ovenable flexible packaging structure comprises a paper layer having a first major surface and a second major surface opposite the first major surface, the paper layer having a cutout defining a window. A printed ink layer is disposed on the first major surface of the paper layer and a varnish layer is disposed over the printed ink layer. A heat sealable polyester layer disposed on the second major surface of the paper layer has a strip of perforations formed therein, wherein the strip of perforations and cutout are at least partially overlapping with each other. An adhesive layer is disposed intermediate the paper layer and the heat sealable polymer layer, the adhesive layer comprising an adhesive for adhesively bonding the paper layer to the heat sealable polymer layer.

In a more limited aspect, the adhesive layer comprises an adhesive free region aligned with the strip of perforations for preventing the adhesive from interfering with the perforations.

In another more limited aspect, the adhesive free region extends in a machine direction of the packaging structure.

In another more limited aspect, the strip of perforations extends in a machine direction of the packaging structure.

In another more limited aspect, the adhesive is one or both of an ovenable adhesive and an adhesive curable with ultraviolet radiation.

In another more limited aspect, the adhesive has a dry coating weight in the range of from 2.5 grams per square meter to 7.5 grams per square meter.

In another more limited aspect, the heat sealable polyester layer comprises a polyethylene terephthalate (PET) based polymer material.

The ovenable flexible packaging structure of claim 1, wherein the heat sealable polyester layer is an ovenable PET material having a seal initiation temperature (SIT) in the range of 80-160 degrees C. when sealed with a sealing pressure of 40 psi and a sealing dwell time of 0.5 seconds.

In another more limited aspect, the heat sealable polyester layer is configured to provide a seal strength in the range of from 200 g/inch to 4000 g/inch.

In another more limited aspect, the heat sealable polyester layer has a thickness in the range of from 12-30 microns.

In another more limited aspect, the paper layer comprises a paper having a basis weight in the range of from about 35 gram per square meter (gsm) to about 130 gsm.

In another more limited aspect, one or both of the ink layer and the varnish layer are curable with ultraviolet radiation.

In another more limited aspect, the varnish layer is formed of a heat-resistant varnish.

In a further aspect, a packaging article comprising the ovenable flexible packaging structure in accordance with this disclosure is provided.

In a more limited aspect, the packaging article is selected from the group consisting of a bag and a pouch.

In a further aspect, a method of making an ovenable flexible packaging structure includes presenting a web comprising a paper substrate having a first major surface and a second major surface opposite the first major surface and forming a cutout defining a window in the paper substrate. A printed ink layer is printed on the first major surface of the paper layer and a varnish layer is applied over the printed ink layer. A web comprising a heat sealable polyester film is presented and a strip of perforations is formed in the heat sealable polyester film. A layer of adhesive is applied to one or both of the second major surface of the paper substrate and the heat sealable polyester film. A laminate is formed by bringing the web of heat sealable polyester film into contact with the paper substrate, wherein the strip of perforations and cutout are at least partially overlapping with each other.

In another more limited aspect, the adhesive layer comprises an adhesive free region aligned with the strip of perforations for preventing the adhesive from interfering with the perforations.

In another more limited aspect, a packaging article is formed using the ovenable flexible packaging structure.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIG. 4 is an isometric, partially exploded view of a second embodiment film construction, wherein the polyester layer has an alternative perforation pattern.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The term "ovenable" refers to packaging films that are able to withstand the high temperatures typically encountered in oven environments (e.g., in ovens which use radiant heating, convection heating, impingement heating, or microwave heating, or some combination thereof), without experiencing significant deterioration, such as burning, scorching, melting, deformation, discoloration, or other adverse effects. The ovenable packaging herein is advantageous for convenience foods or ready-to-eat meals that are intended to be heated or cooked directly in the packaging, which allows the contents to be cooked, heated, or warmed directly in some or all of its packaging, eliminating the need for transferring the food to another container, such as an oven-safe dish. This convenience allows for increased efficiency in quick service restaurants by reducing operational steps, while maintaining the quality and flavor of the food. It also provides convenience to consumers when heating or warming their food at home or on-the-go.

It will be recognized, however, that the products need not be foodstuffs and that the ovenable packaging structures may be used for a range of products, including industrial items, medical or therapeutic products, pharmaceuticals, and others, where consumers or users will want to heat in an oven or similar warming device.

Figure 1:
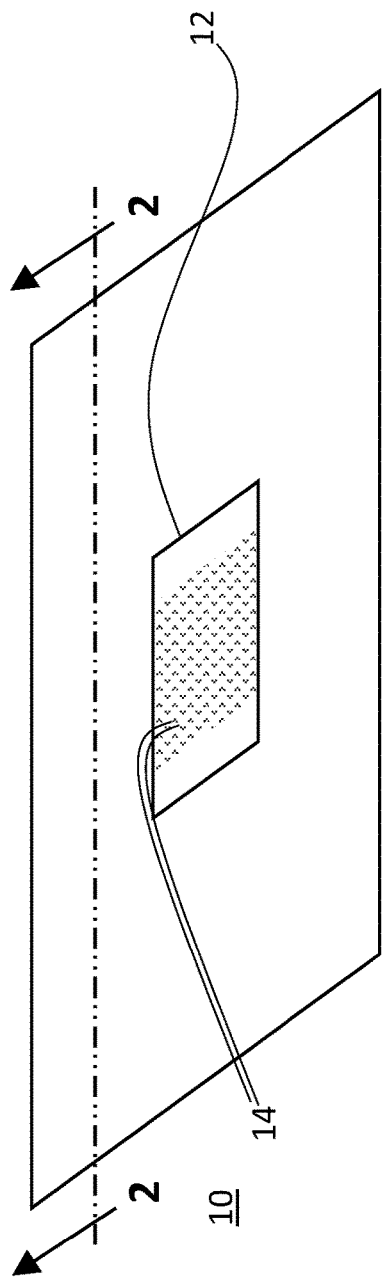
FIG. 1 is an isometric, fragmentary view of a flexible packaging film in accordance with an exemplary embodiment of the invention, taken generally from the side intended to face the exterior in a finished packaging article.

Referring now to the drawings, FIG. 1 illustrates a sheet material 10 comprising a window region 12 for which contains a plurality of perforations 14 for venting during a heating or cooking process. The window size and size of the perforated area illustrated is exemplary only and can be customized, e.g., with respect to the perforated area, perforation density, perforation size, area and shape of the perforated regions/strips, etc., for controlling the evaporation of moisture from the product for better reheating quality. Although a generally rectangular window 12 is depicted, it will be recognized that the window 12 may be of any desired size or geometric shape. Also, in the depicted embodiment of FIG. 1, only a single strip of perforations is shown for ease of exposition, however, it will be recognized that other numbers of strips of perforations are contemplated.

Figure 2:
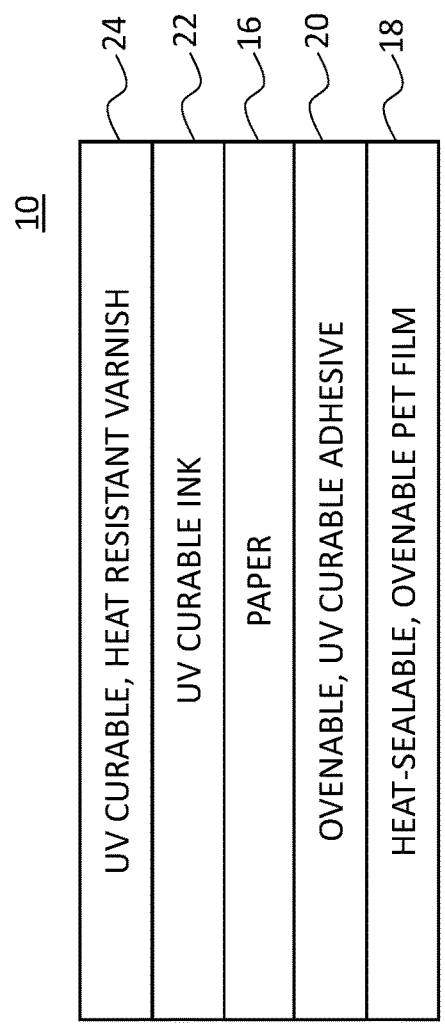
FIG. 2 is across sectional view taken along the lines 2-2 in FIG. 1.

Referring now to FIG. 2, the material 10 includes a paper substrate layer 16 bonded to a heat-sealable polyester film layer 18 via a layer of adhesive 20. The outward facing surface is printed with a printed ink layer 22 for providing viewable indicia on the exterior of a finished packaging article 30 (see, e.g., FIG. 5). A varnish over layer 24 is provided to protect the ink layer 22 from scuffing or rubbing off.

Figure 3:
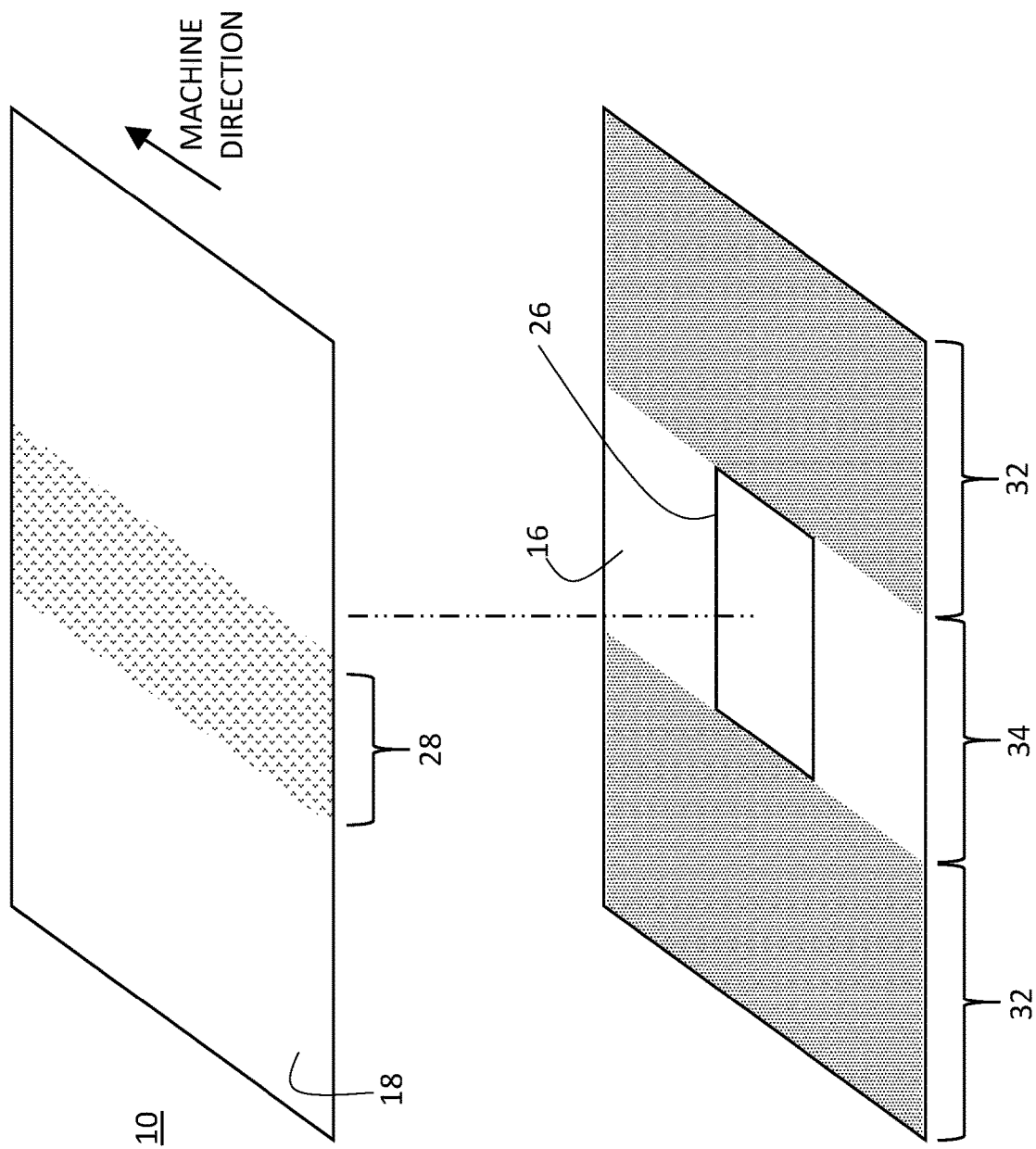
FIG. 3 is an isometric, partially exploded view of the flexible packaging film appearing in FIG. 1, taken generally from the side intended to face the interior in a finished packaging article.

Referring now to FIG. 3, there appears an exploded view illustrating a window cutout 26 formed in the paper substrate 16 and a perforated strip 28 of perforations 14 formed in the polyester layer 18. The adhesive 20 is likewise applied in strips 32 with an adhesive-free region 34 therebetween so that the adhesive does not impinge on the perforations or come into contact with the contents of the packaging article 30. An alternative embodiment 10' appears in FIG. 4 and is as described above except that it has two perforated regions or strips 28'.

In embodiments, the varnish over layer 24 is an ultraviolet (UV) curable, heat-resistant varnish. In embodiments, the ink 22 is a UV-curable ink. In embodiments, the ink and varnish layers are preprinted on the sheet or web 10 which can be stored on a roll for later processing. Alternatively, a printing station can be incorporated into the process line for printing at the same time the packing article is formed. The printed ink layer 22 can be applied to the outer surface of the paper substrate 16 via any conventional printing method as would be understood by persons skilled in the art, including without limitation, using a rotogravure printing apparatus, flexographic printing apparatus, offset printing apparatus, digital printing apparatus, ink jet printing apparatus, or the like.

In embodiments, the paper substrate layer 16 may be any suitable paper and is preferably a paper having a basis weight in the range of from about 35 gram per square meter (gsm) to about 130 gsm, e.g., 35 gsm, 40 gsm, 45 gsm, 50 gsm, 55 gsm, 60 gsm, 65 gsm, 70 gsm, 75 gsm, 80 gsm, 85 gsm, 90 gsm, 95 gsm, 100 gsm, 105 gsm, 110 gsm, 115 gsm, 120 gsm, 125 gsm, or 130 gsm, and more preferably about 70 gsm, and any subrange therein.

In embodiments, the adhesive 20 is an ovenable, UV curable adhesive. The adhesive 20 is applied intermediate the paper substrate layer 16 and the polyester film layer 18. In embodiments, the paper substrate layer 16 and the polyester film layer 18 are laminated by passing the layers between nip rollers. In embodiments, the UV adhesive has a dry or after curing coating weight in the range of from 2.5 gsm to 7.5 gsm, e.g., 2.5 gsm, 3 gsm, 3.5 gsm, 4 gsm, 4.5 gsm, 5 gsm, 5.5 gsm, 6 gsm, 6.5 gsm, 7 gsm, and 7.5 gsm, and more preferably about 5 gsm, and any subrange therein. In embodiments, the coating density of the UV adhesive is selected to provide low odor at elevated temperature while providing adequate bond strength.

The lower the adhesive coverage, the lower the odor and the lower the bond strength between the paper and polyester layers. A low bond strength resulting in easier separation of the paper and polyester layers may be advantageous for separating the layers, e.g., for recycling purposes. In embodiments, the adhesive is applied over 30%-100% of the area of the sheet material 10 excluding the perforated areas 28.

In embodiments, the lamination bond strength is in the range of from about 50 g/inch to about 500 g/inch. It has been found that fiber tear results at around 600-700 g/inch.

In embodiments, the flexible structure 10 has the following structure: UV heat-resistant varnish/UV ink/70 gsm paper/ovenable UV adhesive/heat-sealable, ovenable PET film.

In embodiments, the material 10 is configured to withstand oven temperatures in the range of 120 to 205 degrees Celsius (about 250-400 degrees F.) for a cook time in the range of 5-30 minutes.

In embodiments, the material 10 is configured to withstand an oven temperatures in the range of up to 260 degrees C. (500 degrees F.), e.g., 204-260 degrees C. (400-500 degrees F.) in so-called high speed or rapid cook ovens, such as are available from TurboChef Technologies, Inc. of Carrollton, TX and/or MerryChef, Inc. of Fort Wayne, IN, with a cook time in the range of from 15 seconds to 10 minutes.

In embodiments, the sheet materials herein are EU compliant, FDA compliant, or both. In embodiments, the sheet materials herein are compliant under the US FDA Conditions of Use for Food Contact Substances, condition H (frozen or refrigerated storage: ready-prepared foods intended to be reheated in container at time of use).

In embodiments, the polyester layer 18 is a polyethylene terephthalate (PET) material. In embodiments, the layer 18 is a heat sealable, ovenable PET material having a seal initiation temperature (SIT) in the range of 80-160 degrees C., e.g., 80° C., 85° C., 90° C., 95° C., 100° C., 105° C., 110° C., 115° C., 120° C., 125° C., 130° C., 135° C., 140° C., 145° C., 150° C., 155° C., or 160° C., and any subrange therein, and more preferably about 105° C., when sealed with a sealing pressure of 40 psi and a sealing dwell time of 0.5 seconds.

In embodiments, the seal strength of the polyester layer 18 when heat sealed to itself or another like layer is in the range of from 200-4000 g/inch, e.g., 200 g/inch, 300 g/inch, 400 g/inch, 500 g/inch, 600 g/inch, 700 g/inch, 800 g/inch, 900 g/inch, 1000 g/inch, 1100 g/inch, 1200 g/inch, 1300 g/inch, 1400 g/inch, 1500 g/inch, 1600 g/inch, 1700 g/inch, 1800 g/inch, 1900 g/inch, 2000 g/inch, 2100 g/inch, 2200 g/inch, 2300 g/inch, 2400 g/inch, 2500 g/inch, 2600 g/inch, 2700 g/inch, 2800 g/inch, 2900 g/inch, 3000 g/inch, 3100 g/inch, 3200 g/inch, 3300 g/inch, 3400 g/inch, 3500 g/inch, 3600 g/inch, 3700 g/inch, 3800 g/inch, 3900 g/inch, or 4000 g/inch, and any subrange therein, and is preferably about 500 g/inch. In embodiments, the polyester film 18 has a thickness in the range of from 12-30 microns, e.g., 12 microns, 13 microns, 14 microns, 15 microns, 16 microns, 17 microns, 18 microns, 19 microns, 20 microns, 21 microns, 22 microns, 23 microns, 24 microns, 25 microns, 26 microns, 27 microns, 28 microns, 29 microns, or 30 microns, and any subrange therein.

Figure 5:
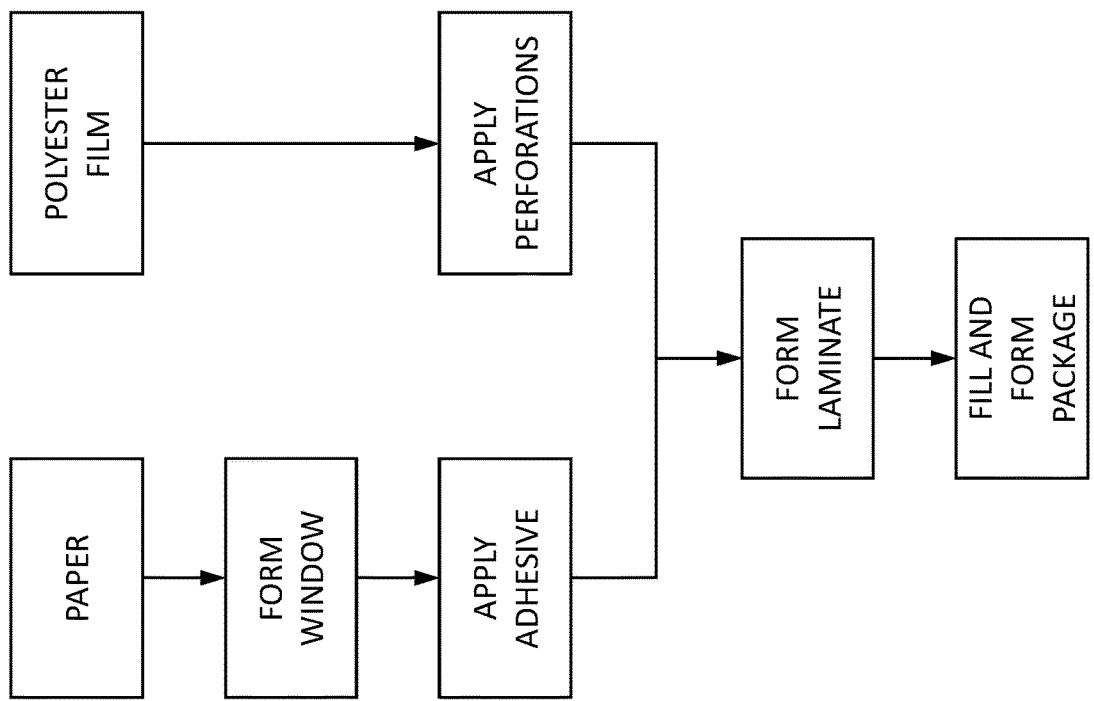
FIG. 5 is a flow chart illustrating an exemplary method for forming the packaging film herein.

FIG. 5 illustrates an exemplary process for forming the laminated structure 10. In embodiments, a paper web is unwound from a roll and a window is formed, e.g., by die cutting. A UV adhesive is applied, e.g., via roll coating to form the strips of adhesive. A polyester web is unwound from a roll and one or more strips of perforations are formed, e.g., using a needle perforation roller. To form the laminate, the paper and polyester webs are brought together, e.g., by feeding them into the nip of a pair of nip rollers and UV radiation is applied to cure the adhesive. The laminate may be wound up onto a take up roll for later use or may be fed to a packaging station such as a flow wrap machine to fil and form the package. In embodiments, the paper and polyester webs may have a breadth that allows forming multiple films side by side which may then be slit to form separate rolls.

Figure 6:
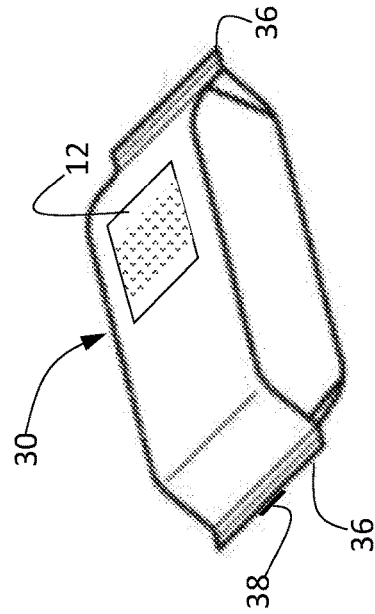
FIG. 6 is an isometric view of a finished packaging article formed of the film appearing in FIG. 1.

FIG. 6 illustrates a packaging article 30. In the illustrated embodiment, the packaging article is a flow wrap type bag having transverse end seals 36 and a longitudinally extending fin seal 38 on the lower or rear surface. It will be recognized that the film structures 10 herein may be used to form other packaging articles, including without limitation, pillow bags, stand up pouches with or without side gussets, quad seal pouches, and others.

The terms "a" or "an," as used herein, are defined as one or more than one. The term "another," as used herein, is defined as at least a second or more. The terms "including" and/or "having" as used herein, are defined as comprising (i.e., open transition). The term "attached," "coupled" or "operatively coupled," as used herein, is defined as indirectly or directly connected.

As used in this application, the terms "front," "rear," "upper," "lower," "upwardly," "downwardly," "left," "right," and other orientation descriptors are intended to facilitate the description of the exemplary embodiment(s) of the present invention, and are not intended to limit the structure thereof to any particular position or orientation.

All numbers herein are assumed to be modified by the term "about," unless stated otherwise. The recitation of numerical ranges by endpoints includes all numbers subsumed within that range (e.g., 1 to 5 includes 1, 1.5, 2, 2.75, 3, 3.80, 4, and 5).

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

Having thus described the preferred embodiments, the invention is now claimed to be:

1. An ovenable flexible packaging structure comprising:
    a paper layer having a first major surface and a second major surface opposite the first major surface, the paper layer having a cutout defining a window;
    a printed ink layer disposed on the first major surface of the paper layer;
    a varnish layer disposed over the printed ink layer;
    a heat sealable polyester layer disposed on the second major surface of the paper layer, the heat sealable polyester layer having a strip of perforations formed therein, the strip of perforations and cutout at least partially overlapping with each other; and
    an adhesive layer intermediate the paper layer and the heat sealable polyester layer, the adhesive layer comprising an adhesive for adhesively bonding the paper layer to the heat sealable polyester layer.

2. The ovenable flexible packaging structure of claim 1, wherein the strip of perforations extends in a machine direction of the packaging structure.

3. The ovenable flexible packaging structure of claim 1, wherein the adhesive is one or both of an ovenable adhesive and an adhesive curable with ultraviolet radiation.

4. The ovenable flexible packaging structure of claim 1, wherein the adhesive has a dry coating weight in the range of from 2.5 grams per square meter to 7.5 grams per square meter.

5. The ovenable flexible packaging structure of claim 1, wherein the heat sealable polyester layer comprises a polyethylene terephthalate (PET) based polymer material.

6. The ovenable flexible packaging structure of claim 1, wherein the heat sealable polyester layer is an ovenable PET material having a seal initiation temperature (SIT) in the range of 80-160 degrees C. when sealed with a sealing pressure of 40 psi and a sealing dwell time of 0.5 seconds.

7. The ovenable flexible packaging structure of claim 1, wherein the heat sealable polyester layer is configured to provide a seal strength in the range of from 200 g/inch to 4000 g/inch.

8. The ovenable flexible packaging structure of claim 1, wherein the heat sealable polyester layer has a thickness in the range of from about 12 to about 30 microns.

9. The ovenable flexible packaging structure of claim 1, wherein the paper layer comprises a paper having a basis weight in the range of from about 35 gram per square meter (gsm) to about 130 gsm.

10. The ovenable flexible packaging structure of claim 1, wherein one or both of the ink layer and the varnish layer are curable with ultraviolet radiation.

11. The ovenable flexible packaging structure of claim 1, wherein the varnish layer is formed of a heat-resistant varnish.

12. The ovenable flexible packaging structure of claim 1, wherein the adhesive layer comprises an adhesive free region aligned with the strip of perforations for preventing the adhesive from interfering with the perforations.

13. The ovenable flexible packaging structure of claim 12, wherein the adhesive free region extends in a machine direction of the packaging structure.

14. A packaging article comprising the ovenable flexible packaging structure of claim 1.

15. The packaging article of claim 14, wherein the packaging article is selected from the group consisting of a bag and a pouch.

16. A method of making an ovenable flexible packaging structure, the method comprising:
- providing a web comprising a paper substrate having a first major surface and a second major surface opposite the first major surface;
- forming a cutout defining a window in the paper substrate;
- forming a printed ink layer disposed on the first major surface of the paper layer and a varnish layer disposed over the printed ink layer;
- providing a web comprising a heat sealable polyester film;
- forming a strip of perforations in the heat sealable polyester film;
- applying a layer of adhesive to one or both of the second major surface of the paper substrate and the heat sealable polyester film; and
- forming a laminate by bringing the web of heat sealable polyester film into contact with the paper substrate, wherein the strip of perforations and the cutout are at least partially overlapping with each other.

17. The method of claim 16, wherein the adhesive layer comprises an adhesive free region aligned with the strip of perforations for preventing the adhesive from interfering with the perforations.

18. The method of claim 16, further comprising forming a packaging article.

\* \* \* \* \*